Patented Jan. 21, 1941

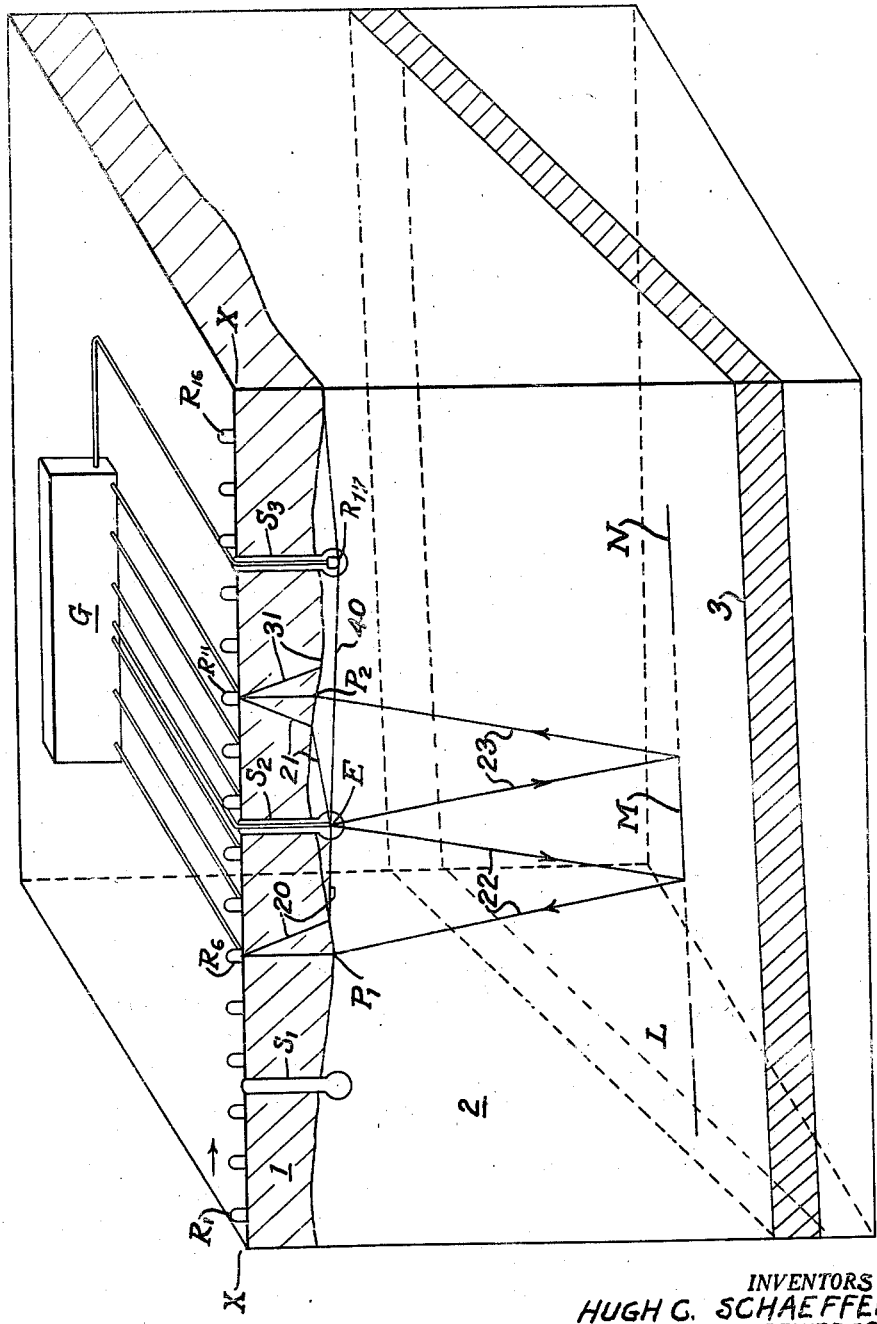

2,229,191

UNITED STATES PATENT OFFICE 2,229,191

METHOD OF MAKING WEATHERING CORRECTIONS

Hugh C. Schaeffer, Tulare, and Raymond A. Peterson, Altadena, Calif., assignors to Consolidated Engineering Corporation, Pasadena, Calif., a corporation of California Application July 28, 1939, Serial No. 287,075

6 Claims. (Cl. 181—0.5)

Our invention pertains to seismic prospecting and in particular provides a method for determining the time required for waves to travel substantially vertically through the weathered layer, and also the thickness of the weathered layer beneath a seismic wave receptor.

In conducting seismic exploration, waves are ordinarily received at a plurality of receptors spaced on the surface of the earth. Due to variations in the thickness of the weathered layer, or low speed layer at the surface, the time required for waves to travel through said weathered layer vary from one receiving position to another. In areas where accurate dip determinations are required it is necessary to be able to correct for such differences in the thickness of the weathered layer. By means of our invention accurate dip determinations become possible.

The principal object of our invention is to provide a method for making weathering corrections especially in areas in which a low speed layer overlies a high speed layer.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way to the apparatus of the present application, as we may adopt various other apparatus embodiments, utilizing the method, within the scope of the appended claims.

The drawing represents an isometric view including a vertical section of the earth and one arrangement of apparatus to which our invention is especially applicable.

In the drawing a weathered layer 1 having a substantially uniform low velocity overlies a high speed subweathered layer 2 which in turn overlies a reflecting bed 3. A line of exploration is laid out along the axis X—X. Along this line of exploration shot holes $S_1$, $S_2$, and $S_3$ are drilled to points beneath the bottom of the weathered layer. Receptors adapted to convert received seismic waves into corresponding electrical waves are shown as $R_1$ to $R_{16}$ laid out successively along the line of exploration X—X.

In one method of investigating the structure beneath the earth's surface for the purposes of determining favorable oil well locations, the dip of reflecting beds is determined at various positions along a line of exploration.

In the arrangement shown a record is made by detonating a charge of explosive E at the bottom of shot hole $S_2$ and the waves generated are detected by a group of receptors $R_6$ to $R_{11}$ straddling said shot hole $S_2$ and corresponding electrical waves are transmitted over cables to a multi-element recording galvanometer G, energized by the usual amplifiers.

In the arrangement shown, the first waves to reach receptors $R_6$ and $R_{11}$ from the charge E are those which travel over paths 20 and 21 partly through the high speed layer 2 and partly through the low speed layer 1. At a later time, waves reflected from bed 3 are received at receptors $R_6$ and $R_{11}$ after being transmitted over paths 22 and 23. Reflected waves are received by all receptors $R_6$ to $R_{11}$ after reflection from the portion M of bed 3.

By shooting at the bottom of shot hole $S_1$ and recording waves received at receptors $R_1$ to $R_6$ the portion L of bed 3 may be investigated. Similarly the portion N of bed 3 may also be investigated by shooting at the bottom of shot hole $S_3$ and recording waves received by receptors $R_{11}$ to $R_{16}$. Dotted lines joining L, M, and N signify portions of bed 3 which are not investigated directly from the procedure outlined but which may be inferred by methods of correlation.

The dip of bed 3 of the portion M is given approximately by the formula $$\theta = \sin^{-1} \frac{V \Delta T}{X} + \alpha \text{ approx.} \quad (1)$$

where
$V$ = speed of waves in high velocity medium 2.
$X$ = distance between end receptors $R_6$ and $R_{11}$.
$\Delta T = (t_{22} - t_6) - (t_{23} - t_{11})$
where
$t_{22}$ = time required for waves to travel from shot E to receptor $R_6$ along path 22.
$t_{23}$ = time required for waves to travel from shot at E to receptor $R_{11}$ along path 23.
$t_6$ = time required for a wave to travel along a substantially vertical path through the weathered layer beneath receptor $R_6$.
$t_{11}$ = time required for a wave to travel along a substantially vertical path through the weathered layer beneath receptor $R_{11}$.
$\alpha$ = the angle between a horizontal line and a line joining points $p_1$ and $p_2$ beneath receptors $R_6$ and $R_{11}$ and at the bottom of the weathered layer.

On applying Equation 1 appropriate sign conventions for $\alpha$ and $\theta$ should be adopted to avoid errors.

It will be clear to those skilled in the art that the value of $\alpha$ may be determined from the relative elevation of the end receptors $R_6$ and $R_{11}$, the distance between said end receptors and the thickness of the weathered layer beneath said end receptors.

Our problem is to provide a method for making weathering corrections by determining the thickness of the weathered layer and the time required for waves to travel therethrough at end receptors $R_6$ and $R_{11}$.

As an example, to make weathering corrections for the weathered layer beneath the receptor $R_{11}$ we proceed as follows.

Prior to making a recording of the shot E at receptors $R_6$ to $R_{11}$ we place an auxiliary receptor $R_{17}$ at the bottom of shot hole $S_3$ and connect it to an auxiliary recording unit of multi-element recording galvanometer G.

When charge E is detonated by operation of a blaster (not shown), we record the instant of detonation of said charge E on one of the units of recording galvanometer G.

The waves traversing the refraction paths 20 and 21 and the reflection paths 22 and 23 and other waves received by the group of receptors $R_6$ to $R_{11}$ are recorded as hereinabove explained. In addition a recording is made of the waves traversing the path 40 and received at $R_{17}$. In a similar manner we subsequently set up the apparatus to shoot at the bottom of shot holes $S_3$ and record at receptors $R_{11}$ and $R_{16}$.

From the aforementioned records we are able to determine the following travel times.

$t_{21}$ = time required for a wave to travel from a charge E at the bottom of shot holes $S_2$ to receptor $R_{11}$ along path 21.

$t_{31}$ = time required for a wave to travel from a similar charge at the bottom of shot hole $S_3$ to receptor $R_{11}$ along path 31.

$t_{17}$ = time required for a wave to travel from the bottom of shot hole $S_2$ to the bottom of shot hole $S_3$ along a direct path 40 through the high speed layer 2.

It can be shown readily that the time $t_{11}$ required for waves to travel substantially vertically through the weathered layer beneath receptor $R_{11}$ is given approximately by the formula $$t_{11} = 1/2[(t_{21}+t_{31})-t_{17}]\left(1+1/2\frac{V_1^2}{V_2^2}\right) \quad (2)$$

where $V_2$ is the velocity of seismic waves in the high speed layer 2 which may be determined if desired from $t_{17}$ and the distance between shot holes $S_2$ and $S_3$; and where $V_1$ is the velocity of seismic waves in the low speed layer 1. $V_1$ need not be known exactly for this purpose as it enters into Formula 2 only as a correction factor. However, in many areas $V_1$ is substantially constant and may accordingly be determined once and for all by any special method useful for this purpose.

It is to be noted that Equation 2 may be rewritten as $$t_{11} = 1/2[t_{31}-(t_{17}-t_{21})]\left(1+1/2\frac{V_1^2}{V_2^2}\right)$$

which means that it is not necessary to know both $t_{17}$ and $t_{21}$ but only the difference between them.

Having determined $t_{11}$, the thickness $d_{11}$ of the weathered layer beneath receptor $R_{11}$ may be found from the relation $$d_{11}=V_1 t_{11}$$

By making similar measurements for receptor $R_6$ such as by shooting at the bottom of shot hole $S_1$ and receiving at receptors $R_1$ to $R_6$ and a receptor at the bottom of shot hole $S_2$ in accordance with the procedure outlined above, we are able to obtain the time $t_6$ the time required for waves to travel through the weathered layer beneath receptor $R_6$ and the depth of the weathered layer beneath receptor $R_6$.

It is clear that by means of the weathering data obtained for receptors $R_6$ and $R_{11}$ accurate determinations of the dip of the portion M of bed 3 may be obtained.

While we have described our invention with reference to a particular arrangement of seismic prospecting apparatus it is to be understood that we do not intend to be limited to the details of the description as various forms of our invention may be adopted within the scope of the appended claims. In particular it is to be understood that the receptor, for which weathering corrections are desired, need not lie on a straight line joining the shot holes used therewith, but may be offset therefrom any amount which does not introduce appreciable error. In case the offset distances are not negligible, suitable correction factors may be made therefor.

Broadly speaking our invention provides for making weathering corrections at a receptor position intermediate two shot holes drilled to points adjacent the bottom of the weathered layer and substantially in line with said shot holes. For this purpose we may record the time for seismic waves to travel from the bottom of each shot hole to said receptor position and the time for waves to travel from the bottom of one shot hole to the bottom of the other.

We claim:

1. A method for making weathering corrections in an area in which a low speed surface layer overlies a high speed layer, comprising drilling two spaced shot holes in the earth to depths adjacent the bottom of said surface layer, planting a seismic wave receptor station on or adjacent the earth's surface at a point intermediate said shot holes and substantially in line therewith and a second seismic wave receptor station at the bottom of one of said shot holes, generating seismic waves successively at the bottom of each of said shot holes, measuring the time required for a seismic wave to travel from each shot hole to said intermediate point, along a path including a portion within and adjacent the top of said high speed layer, and substantially parallel thereto, and measuring the time required for a seismic wave to travel from the bottom of one shot hole to the bottom of the other shot hole also over a path including a portion within and adjacent the top of said high speed layer and substantially parallel thereto.

2. A method for making weathering corrections in an area in which a low speed surface layer overlies a high speed layer, comprising drilling two spaced shot holes in the earth to depths penetrating the top of said high speed layer, establishing a seismic wave receptor station on or adjacent the earth's surface at a point intermediate said shot holes and substantially in line therewith, establishing a seismic wave receptor at the bottom of one of said shot holes, generating a seismic wave at the other of said shot holes, measuring the relative times required for a refracted wave to travel to a receptor at said surface station and a direct wave to travel to said receptor at the bottom of said one shot hole, generating a seismic wave at the bottom of said one shot hole, and measuring the time required for a refracted wave to travel from said one shot hole to said surface receptor.

3. A method for making weathering corrections in an area in which a low speed surface layer overlies a high speed layer, comprising drilling two spaced shot holes in the earth to penetrate the top of said high speed layer, establishing a seismic wave receptor station on or adjacent the earth's surface at a point intermediate said shot holes and substantially in line therewith and a second seismic wave receptor station at the bottom of one of said shot holes, generating seismic waves successively at the bottom of each shot hole, measuring the time required for a seismic wave to travel from each shot hole to said intermediate point along paths including portions substantially parallel to the top part of said high speed layer, and measuring the time required for a seismic wave to travel from the bottom of one shot hole to the bottom of the other shot hole along a direct path through said high speed layer.

4. A method for making weathering corrections in an area in which a low speed surface layer overlies a high speed layer, comprising drilling two spaced shot holes in the earth to depths just beneath said surface layer, establishing a seismic wave receptor station on or adjacent the earth's surface at a point intermediate said shot holes and substantially in line therewith, establishing a seismic wave receptor at a point at the bottom of one of said shot holes, generating a seismic wave at the bottom of the other of said shot holes, measuring the relative times required for said refracted wave to travel to a receptor at said surface station and a direct wave to travel to a receptor at the bottom of said one shot hole, generating a seismic wave at the bottom of said one shot hole, and measuring the time required for a seismic refracted wave to travel from said one shot hole to said surface receptor.

5. A method for obtaining data for making weathering corrections in an area in which a low speed surface layer overlies a high speed layer, comprising generating a first seismic wave at a generating point adjacent the earth's surface, measuring the time required for said first seismic wave to travel from said generating point to a surface reception point along a path including portions within said high speed layer and substantially parallel to the top to travel from said generating point to a second reception point also along a path including a portion within said high speed layer and substantially parallel to the top thereof, generating a second seismic wave at one of said reception points and measuring the time required for said second seismic wave to travel from said one reception point to the other of said reception points also along a path including a portion within said high speed layer and substantially parallel to the top thereof, all said portions of paths lying within said high speed layer being substantially parallel.

6. A method for obtaining data for making weathering corrections in an area in which a low speed layer overlies a high speed layer, comprising generating a first seismic wave at a generating point adjacent the earth's surface, measuring the relative time required for said first wave to travel from said generating point to each of two reception points substantially collinear therewith, at least one of said reception points lying above the bottom of said weathered layer, generating a second seismic wave at one of said reception points, and measuring the time required for said second seismic wave to travel from said one reception point to the other of said reception points, all said waves for which said time measurements are made having included as parts of their travel paths portions lying within said high speed layer substantially parallel to the interface between said high speed layer and said low speed layer.

HUGH C. SCHAEFFER.
RAYMOND A. PETERSON.